Oct. 7, 1930.    S. T. MALTBY    1,777,802
CUT-OFF MECHANISM FOR STRAW MACHINES
Filed April 8, 1929    3 Sheets-Sheet 1
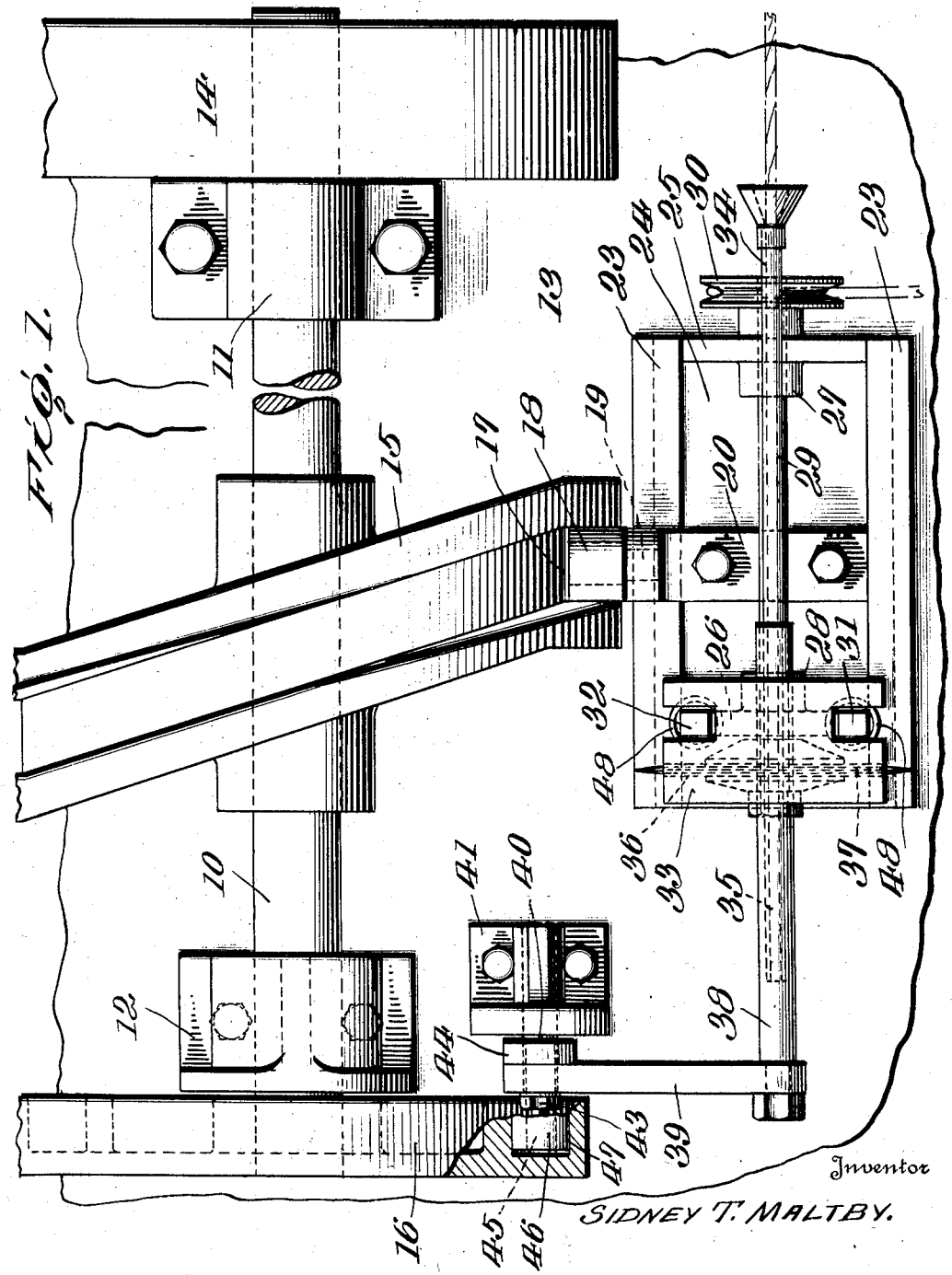
Inventor
SIDNEY T. MALTBY.
By Wolfe, Littlehales & Hillmann
Attorneys

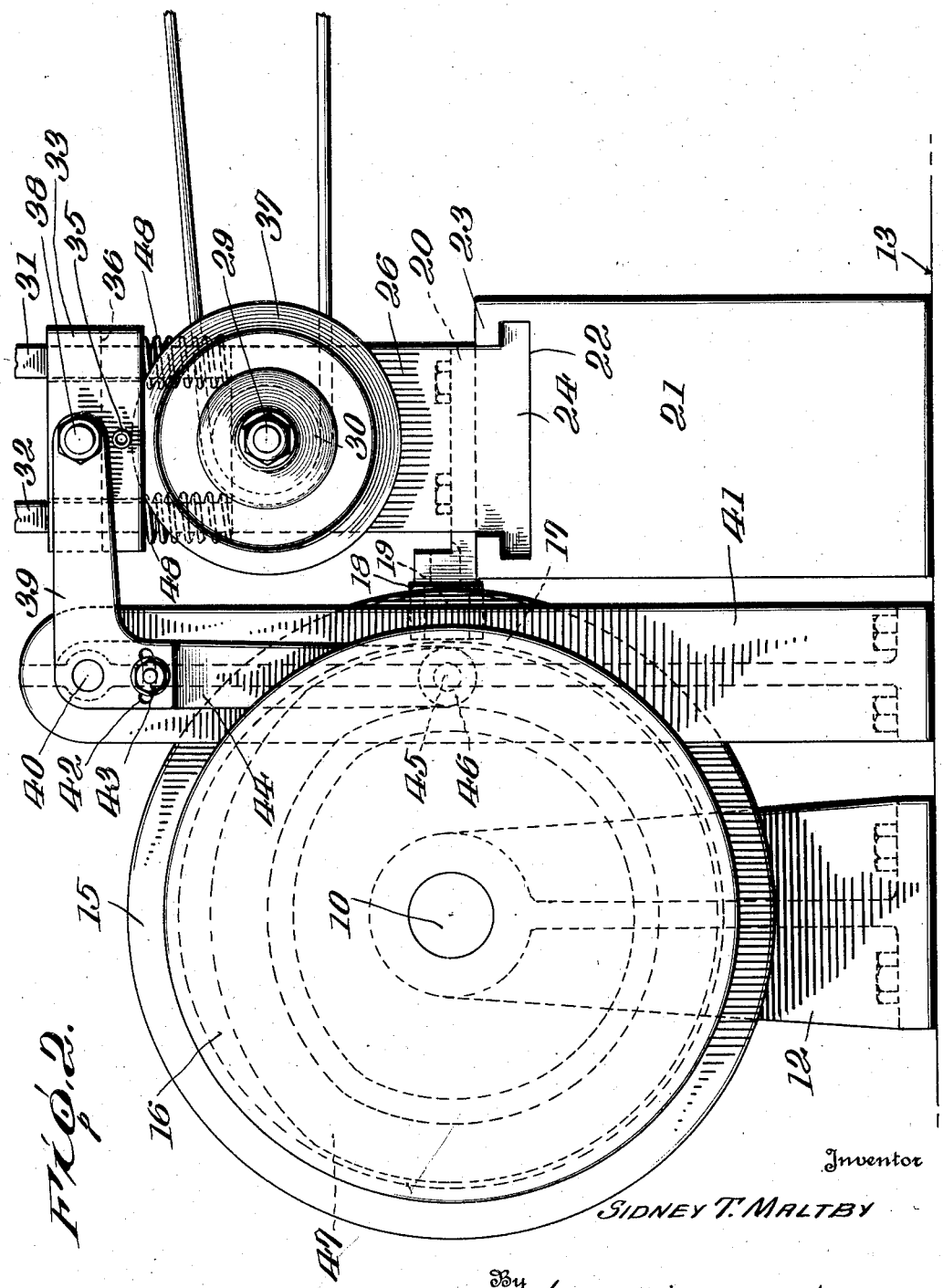

Oct. 7, 1930.  S. T. MALTBY  1,777,802
CUT-OFF MECHANISM FOR STRAW MACHINES
Filed April 8, 1929   3 Sheets-Sheet 3
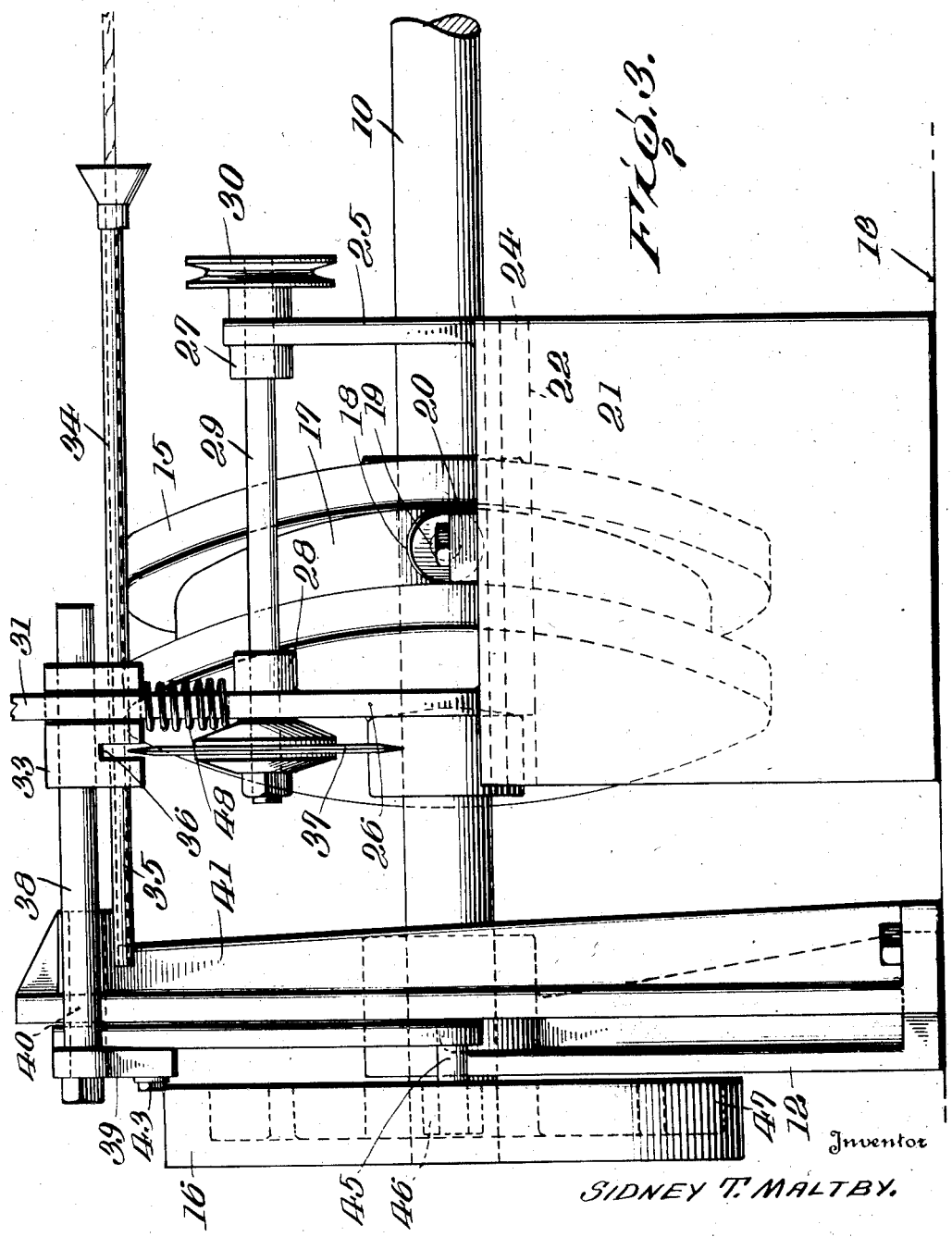
Inventor
SIDNEY T. MALTBY.
By Wolfe, Littlehales & Hellmann
Attorneys Patented Oct. 7, 1930

1,777,802

UNITED STATES PATENT OFFICE

SIDNEY T. MALTBY, OF WASHINGTON, DISTRICT OF COLUMBIA, ASSIGNOR TO STONE STRAW CORPORATION, OF WASHINGTON, DISTRICT OF COLUMBIA, A CORPORATION OF DELAWARE

CUT-OFF MECHANISM FOR STRAW MACHINES

Application filed April 8, 1929. Serial No. 353,532.

This invention relates to cut-off mechanism for straw machines and it comprises a cutter reciprocable in a path substantially parallel with that of a continuously formed tube or straw, a straw guide reciprocable in unison with the cutter, the guide being periodically moved to carry the straw into cutting relation with the cutter to thereby cut it into convenient lengths; all as will be hereinafter more fully described, and as claimed.

It is an object of my invention to provide a cut-off mechanism for straw machines, wherein a continuously formed paper tube is periodically moved into a cutter travelling in the same direction as the tube, and is thereby cut into lengths.

A further object is to provide a cut-off mechanism for a continuously formed paper tube, wherein the tube is supported in a reciprocable guide adapted, in one direction of its reciprocation, to travel with the tube, the guide also being periodically moved bodily at right angles to the path of a cutter which reciprocates in unison with the guide, thereby carrying the tube into position to be cut at predetermined intervals in its travel.

Other and further objects will be apparent from the following description and drawings, in which Figure 1 is a plan view, partly in section, of the cut-off mechanism comprising my invention;

Figure 2 is an end view of the cut-off, taken from the left of Figure 1;

Figure 3 is a side view.

Referring more particularly to the drawings:

A shaft 10, journalled in bearings 11 and 12 which are bolted to a bed 13, is rotated by any well known means, as pulley 14, and cam disks 15 and 16 are keyed or otherwise affixed to the shaft. The cam disk 15 is formed with a peripheral cam groove 17, which guides a roller 18, journalled upon the pintle 19 of an arm 20.

Also mounted on the bed of the machine is a standard 21, the upper surface of which is grooved as at 22 to provide inturned flanges 23 for guiding and retaining a slide 24, having a base of complementary shape. The arm 20 is secured to slide 24 to impart a reciprocating movement to the slide in the operation of the mechanism.

The slide 24 has upstanding end walls 25 and 26, which are formed with bosses 27 and 28, respectively, for the reception of a rotary shaft 29. The shaft is driven in any convenient manner, as by a belt (Figures 1 and 2) and pulley 30. The end wall 26 is provided with spaced projections in the form of posts 31 and 32, shown in the drawings as integral parts of the end wall 26, but which, of course, may be detachable.

A straw guide 33 has its opposite side faces vertically groved (as shown more particularly in Figure 1) for the reception of the spaced posts 31 and 32, and its lower portion is bored to receive a tubular guide comprising sections 34 and 35 which are separated by a slot 36 in the under face of the guide block.

A rotary cutter 37, preferably of disk shape, is mounted on the end of shaft 29 and is so positioned relative to the guiding posts 31 and 32 of the slide that its cutting edge is presented to the slot 36 formed in the straw guide.

The straw guide 33 is slidably mounted on a stub shaft 38, carried by a bell crank lever 39, which is pivoted as at 40 on a standard 41 rising from the machine bed. One arm of the lever is provided with an arcuate slot 42 (Figure 2), through which passes a bolt 43 extending from a lever 44. By loosening the nut on the end of bolt 43 the levers 39 and 44 may be relatively adjusted to provide a bell crank lever of variable angularity, whereby adjustment may be made to compensate for wear.

The arm 44 carries at its end a projecting pintle 45, on which is mounted a roller 46 adapted to engage the cam groove 47 in the side face of cam disk 16.

In operation of the cut-off mechanism, rotation of the shaft 10 causes reciprocation of the slide through the medium of cam disk 15 and the cooperating arm 20, which is carried by the slide. The straw tube guide 33, likewise, is reciprocated because of its engagement with the upright posts 31 and 32 of the slide. The cutter, being carried by the slide, reciprocates in unison with the straw guide, and is continuously presented to the groove 36 in the guide preparatory to a cutting operation.

Simultaneous with such reciprocation of the guide and cutter the cam disk 16 effects bodily movement of the guide relative to the cutter through the bell crank lever heretofore described, and because of the adjustability of the bell crank lever the guide can be suitably positioned vertically with respect to the cutter.

After each movement of the guide toward the cutter, it is withdrawn, primarily because of the shape of cam groove 47, but its return is assisted by coiled springs 48 which surround the upright posts 31 and 32 and are interposed between the straw guide and upright end wall 26 of the slide.

Thus, a continuously formed paper tube or straw, fed from the left as seen in Figures 1 and 3 of the drawing, will be guided in the members 34, 33 and 35 and will be periodically moved into cutting relation with the rotary cutter, while both the cutter and guide are moving in the same direction as the straw tube. Inasmuch as the cutter is travelling with the tube at the time the cut is made no damage, such as buckling, will result to the tube.

It is to be understood that this invention is not restricted to the cutting of so-called straws but that it also contemplates the cutting of larger diameter tubing.

Having described my invention, what I claim is:

1. Cut-off mechanism for straws comprising a reciprocable cutter, a straw guide movable in unison with said cutter, and means for bodily moving said straw guide toward said cutter at right angles thereto during their reciprocation, whereby a straw carried by the guide will be moved into the path of the cutter and severed.

2. Cut-off mechanism for tubes comprising a reciprocating slide, a cutter carried thereby, a tube guide reciprocable with said slide, and means for periodically imparting to the tube guide a motion of translation to move it bodily toward said cutter, whereby the tube guided thereby will be cut into lengths.

3. Cut-off mechanism for straws comprising a reciprocating slide, a rotary cutter carried thereby, a straw guide mounted to reciprocate with said slide, and means independent of said slide for periodically moving the straw guide bodily into the cutting path of said cutter at right angles thereto.

4. Cut-off mechanism for straws comprising a reciprocating slide, a rotary cutter carried thereby, a straw guide carried by said slide to reciprocate therewith but freely movable in a plane angularly disposed with relation to that in which the slide reciprocates, and means for bodily moving said straw guide in such plane by imparting to it a motion of translation to carry it into and out of the cutting path of said cutter.

5. Cut-off mechanism for tubes comprising a cam operated reciprocating slide, a cutter carried thereby, a cam operated bodily movable tube guide, guiding means carried by said slide and engaging said tube guide to impart reciprocation thereto in unison with the slide, yet permitting bodily movement of the guide toward and away from the slide, and means for imparting a motion of translation to the guide.

6. Cut-off mechanism for tubes comprising a rotary shaft, a cam actuated by rotation of the shaft, a slide having an arm engaging said cam to impart reciprocation thereto, a rotary cutter carried by said slide, a second cam, a tube guide having a motion of translation imparted to it by said second cam, guiding means carried by said slide and engaging the tube guide to impart reciprocation thereto in unison with the slide, yet permitting movement of the guide toward and away from the slide.

7. Cut-off mechanism for straws comprising a rotary shaft, a cam mounted on said shaft, a slide having an arm engaging said cam to be reciprocated thereby, a rotary cutter carried by said slide, a second cam on said shaft, a lever engaging said second cam to be oscillated thereby, a stub shaft carried by said lever, a straw guide slidable on said stub shaft, spaced guiding members carried by the slide and engaging the guide, whereby the said guide will be reciprocated with the slide by rotation of the first-named cam, and will be independently moved toward said cutter at periodic intervals by said second cam.

8. Cut-off mechanism for straws comprising a rotary shaft, a cam mounted on said shaft, a slide, an arm extending from said slide and engaging the cam to impart reciprocating motion to the slide, a rotary cutter mounted on said slide, spaced upright members extending from the slide adjacent the cutter, a straw tube guide grooved to receive said spaced members slidably mounted thereon, a second cam mounted on the shaft, a bell crank lever engaging said second cam at one end, a stub shaft projecting from the other end of said bell crank lever, the said straw tube guide being slidable on said stub shaft, and spring means interposed between said slide and guide for normally tending to hold the guide away from the cutter.

In testimony whereof I affix my signature.

SIDNEY T. MALTBY.